(12) United States Patent
Yong et al.

(10) Patent No.: US 8,000,346 B2
(45) Date of Patent: Aug. 16, 2011

(54) ASON/GMPLS ARCHITECTURE EXTENSION FOR RESERVATION BASED AND TIME BASED AUTOMATIC BANDWIDTH SERVICE

(75) Inventors: Lucy Yong, Plano, TX (US); Linda Dunbar, Plano, TX (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1082 days.

(21) Appl. No.: 11/532,457

(22) Filed: Sep. 15, 2006

(65) Prior Publication Data
US 2008/0069133 A1    Mar. 20, 2008

(51) Int. Cl.
 *H04J 3/16*    (2006.01)
 *G06F 15/173*    (2006.01)
(52) U.S. Cl. ........................................ 370/468; 709/225
(58) Field of Classification Search .................. None
See application file for complete search history.

(56) References Cited

U.S. PATENT DOCUMENTS

| | | | | | |
|---|---|---|---|---|---|
| 6,115,382 | A | * | 9/2000 | Abe | 370/395.3 |
| 6,278,712 | B1 | * | 8/2001 | Takihiro et al. | 370/400 |
| 6,625,643 | B1 | * | 9/2003 | Colby et al. | 709/217 |
| 7,065,042 | B1 | * | 6/2006 | Pan et al. | 370/229 |
| 2002/0004833 | A1 | * | 1/2002 | Tonouchi | 709/229 |
| 2002/0114274 | A1 | * | 8/2002 | Sturges et al. | 370/229 |
| 2003/0028656 | A1 | * | 2/2003 | Babka | 709/229 |
| 2004/0073650 | A1 | * | 4/2004 | Nakamura | 709/223 |
| 2005/0105905 | A1 | * | 5/2005 | Ovadia et al. | 398/47 |
| 2006/0077988 | A1 | * | 4/2006 | Cheng et al. | 370/401 |
| 2006/0285542 | A1 | | 12/2006 | Dunbar et al. | |
| 2007/0002897 | A1 | * | 1/2007 | Goshen et al. | 370/468 |
| 2007/0043940 | A1 | * | 2/2007 | Gustave et al. | 713/150 |
| 2007/0094665 | A1 | * | 4/2007 | Jackson | 718/104 |
| 2007/0133403 | A1 | * | 6/2007 | Hepworth et al. | 370/229 |

FOREIGN PATENT DOCUMENTS

| | | |
|---|---|---|
| CN | 1423460 A | 6/2003 |
| CN | 1595892 A | 3/2005 |
| JP | 2005167539 A | 6/2005 |
| KR | 20060040637 A | 5/2006 |
| WO | 2005043843 A1 | 5/2005 |

OTHER PUBLICATIONS

Foreign Communication From a Related Counterpart Application—International Search Report and Written Opinion, PCT/CN2007/070019, Aug. 2, 2007, 8 pages.

* cited by examiner

*Primary Examiner* — Ricky Ngo
*Assistant Examiner* — Clemence Han
(74) *Attorney, Agent, or Firm* — Conley Rose, P.C.; Grant Rodolph

(57) ABSTRACT

A telecommunications network comprising components configured to implement a method comprising: receiving a reservation from a customer, reserving a network resource specified in the reservation, initiating the establishment of a reserved connection through a network, the reserved connection parameters based on the reservation, subsequent to the establishment of the reserved connection, detecting a data stream transmitted from the customer, and allowing the data stream to be transported over the network using the reserved connection. Also disclosed is a method for reserving bandwidth on a network, the method comprising: submitting a reservation request specifying a bandwidth requirement and a start time, receiving a confirmation that the reservation has been accepted, and transmitting a data stream to a network at the start time, wherein the data stream is transported over the network using no more than the bandwidth specified in the reservation request.

20 Claims, 6 Drawing Sheets

ASON/GMPLS ARCHITECTURE EXTENSION FOR RESERVATION BASED AND TIME BASED AUTOMATIC BANDWIDTH SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication networks allow data to be transferred between electronic devices. Specifically, a source electronic device, such as a computer or a telephone, starts the transfer process by passing the data to the network. The network transports the data from the source device to a destination device, where the data may then be used as desired. The elapsed time between transmission of the data by the source device and receipt of the data by the destination device is dependent in part on the amount of bandwidth available on the network. Specifically, if there is a relatively large amount of available bandwidth, then the data may reach the destination device relatively quickly. However, if there is a relatively small amount of available bandwidth, then the data may take considerably longer to reach the destination device.

One of the problems with existing networks is that it is difficult to predict the amount of network bandwidth that is available or required at any given time. From the customer side, it is difficult to predict the amount of bandwidth that will be available when data is transmitted. Such unpredictability in available bandwidth leads to an unpredictability in the transmission time, which causes customer frustration. From the provider side, it is difficult to predict when customers will request network bandwidth, as well as how much bandwidth they will request. Such unpredictability in required bandwidth may cause a shortage of bandwidth at particular times, which causes provider frustration.

SUMMARY

In one aspect, the invention includes a telecommunications network comprising components configured to implement a method comprising: receiving a reservation from a customer, reserving a network resource specified in the reservation, initiating the establishment of a reserved connection through a network, the reserved connection parameters based on the reservation, subsequent to the establishment of the reserved connection, detecting a data stream transmitted from the customer, and allowing the data stream to be transported over the network using the reserved connection.

In another aspect, the invention includes a method for reserving bandwidth on a network, the method comprising: submitting a reservation request specifying a bandwidth requirement and a start time, receiving a confirmation that the reservation has been accepted, and transmitting a data stream to a network at the start time, wherein the data stream is transported over the network using no more than the bandwidth specified in the reservation request.

In a third aspect, the invention includes a system comprising: a network comprising a plurality of nodes having a control plane and data plane, and a reservation scheduling system in communication with the control plane and a customer that originates a reservation, wherein the control plane establish the connection path and the data plane transmits data received from the customer over the network based on the reservation.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in reserved connection with the accompanying drawings and detailed description, wherein like reference numerals represent like parts.

DETAILED DESCRIPTION

It should be understood at the outset that although an illustrative implementation of one embodiment of the present disclosure is described below, the present system may be implemented using any number of techniques, whether currently known or in existence. The present disclosure should in no way be limited to the illustrative implementations, drawings, and techniques described below, including the exemplary design and implementation illustrated and described herein, but may be modified within the scope of the appended claims along with their full scope of equivalents.

Described herein is a network configuration that allows a customer to reserve network bandwidth between a source and a destination. Specifically, the network configuration allows a customer to reserve network bandwidth prior to transmitting any data. When the customer subsequently transmits the data to the network, the data is transported over the network using the reserved bandwidth. The reservation system allows the customer to reliably predict the amount of bandwidth that will be available for data transmission through the network. Similarly, the reservation system allows the network provider to reliably predict when bandwidth will be needed by the customers, and the amount of such bandwidth. As explained in detail below, the disclosed reservation system is advantageous because it eliminates the need for a signaling channel between the customer and the network. Instead, the connection request is created by a Reservation Scheduling System (RSS) in accordance with the reservation, and passed onto the control plane so that the control plane can establish the reserved connection in the data plane before the data plane receives the data stream from the customer. The elimination of the signaling channel between the customer and the control plane increases the security of the control plane and enables the reservation based automatic bandwidth services.

Figure 1:
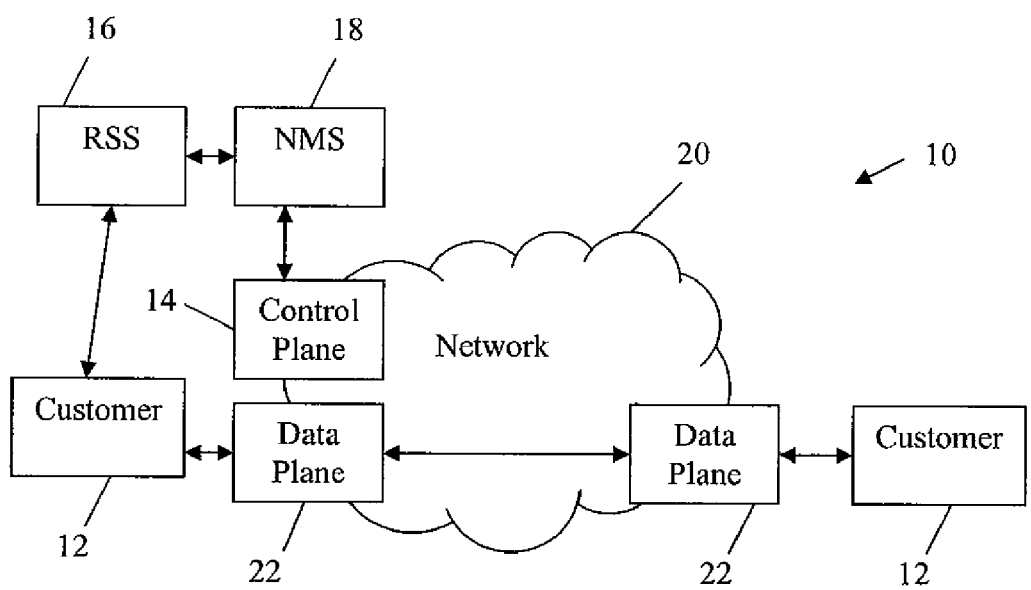
FIG. 1 is one embodiment of a communications network framework.

FIG. 1 illustrates an embodiment of a system 10 within which network bandwidth may be reserved. The system 10 comprises a RSS 16, customers 12, 24, a network 20, a Network Management System (NMS) 18, a control plane 14, and a data plane 22. Generally, data flows from left to right through FIG. 1 such that the customer 12 is the data source and the customer 24 is the data destination. However, the system 10 may be configured such that the customer 24 is the data source and the customer 12 is the data destination. In the embodiment where the customer 12 is the data source, the customer 12 sends a reservation request to the RSS 16 when the customer 12 wants to reserve bandwidth on the network 20. The RSS 16 then coordinates with the NMS 18 and the control plane 14 to ensure that the requested bandwidth is available at the requested time. When the reservation time occurs, the RSS 16, the NMS 18, and/or the control plane 14 establish a reserved connection through the network 20. When the customer 12 subsequently transmits the data to the data plane 22, the data is transported through the reserved connection toward the customer 24. It should be understood that while the system 10 components illustrated in FIG. 1 are shown as separate blocks, it is contemplated that one or more of these components may be combined into a single component. For example, the RSS 16 and the NMS 18 may be integrated into a single component with the functionality of both the RSS 16 and the NMS 18. It is also contemplated that the network configurations disclosed herein may be used to reserve network resources other than the network bandwidth.

In an embodiment, the RSS 16 is any device or component that allows a customer 12 to reserve network bandwidth. Specifically, the RSS 16 may receive reservation requests from a plurality of customers 12, 24 and confirm the reservations with the customers 12, 24. The RSS 16 communicates such requests to the NMS 18 and the control plane 14, and reserves the bandwidth when service time arrives. After the control plane 14 completes the bandwidth allocation in the data plane 22, it will send for a confirmation message to the NMS 18 and the RSS 16. The RSS 16 may also receive bandwidth reservation confirmation and/or modification messages and pass such messages onto the customer 12. When the reservation start time occurs, the RSS 16 may send a connection request to the control plane 14 so that the control plane 14 can have the reserved connection established when the data plane 22 receives data from the customer 12. The RSS 16 may be embodied in a web-based application provided by the network 20 so as to facilitate ease of access and secure communication between the RSS 16, the customer 12, and the NMS 18. The RSS 16 may also contain a database of reservation information comprising: the reservations associated with each customer 12, 24, the amount of bandwidth associated with each reservation, the start time of each reservation, the duration or end time of each reservation, the frequency of each reservation, the policy profile for each reservation, and/or the network route associated with each reservation.

In an embodiment, the customers 12, 24 are any device, component, or network 20 that may produce and/or receive data. The customers 12, 24 may be customer-oriented wireline networks or nodes, such as Digital Subscriber Line (DSL) connections or IEEE 802 networks, or customer-oriented wireless networks, such as a cellular network. Alternatively, the customers 12, 24 may be fixed or mobile user-oriented devices, such as desktop computers, notebook computers, personal digital assistants (PDAs), or cellular telephones. Because the customers 12, 24 may produce and/or receive data streams, the customers 12, 24 may be either a source or a destination as those terms are used herein.

In an embodiment, the network 20 is any computer system that may be used to transport data between customers 12, 24. Specifically, the network 20 may be any network within which bandwidth and/or a connection path may be reserved. In an embodiment, the network 20 may be an optical network, such as an Automatically Switched Optical Network (ASON) or Generalized Multi-Protocol Label Switching (GMPLS) network. In another embodiment, the network 20 may include a Packet Switched Network (PSN) that transport IP traffic between the customers 12, 24. For example, the network 20 may transfer data packets between DSL Access Multiplexers (DSLAMs), Radio Network Controllers (RNCs), and/or Internet Protocol/Multi-Protocol Packet Label Switching (IP/MPLS) networks. Alternatively, the network 20 may be any other type of data transport network known to persons of ordinary skill in the art.

In an embodiment, the NMS 18 is any device or component that manages the transmission of data over a network 20. When the reservation start time occurs, the NMS 18 may send the connection request to the control plane 14. The connection request identifies the customer 12 that the control plane 14 should expect data to come from, and may optionally include the connection route for such data. Once the reserved connection is established, the NMS 18 may also collect fault alarm and performance data on the reserved connection.

In an embodiment, the control plane 14 is any device or component that contains knowledge of the network, such as the network topology and resources. The control plane 14 is able to select a connection path between any two connection points in the network 20. The control plane 14 is also able to transmit signals through the network 20 to establish the connection path in the data plane 22 using the GMPLS signaling protocol. The RSS 16 and NMS 18 communicate with the control plane 14 to send the reservation connection request to the control plane 14. The RSS 16 and the NMS 18 also obtain the reservation confirmation from the control plane 14 after the control plane 14 completes the connection establishment in the data plane 22.

In an embodiment, the data plane 22 is any device or component that transmits data between the customer 12, 24 and the network 20. Specifically, the data plane 22 may accept data from one of the customers 12, 24 and transmit the data through a network 20. The data plane 22 may be connected to the customers 12, 24 using physical ports and synchronous optical network (SONET) or Ethernet interfaces. When transmitting data, the data plane 22 pass data through the network 20 using the reserved connection path. Such reserved connection paths may be static, or the control plane 14 may dynamically adjust the reserved connection paths based on the conditions within the network 20. The control plane 14 may also establish, modify, and terminate a plurality of connections throughout the network 20 associated with various data streams. The data plane 22 may detect the data transmission start and/or end and inform the control plane 14 of such events. The data plane 22 may also monitor the connection path quality and inform the NMS 18 any failure on the path.

One of the advantages of the present network configuration is that it eliminates the need for a signaling channel between the customer 12 and the network 20. In an ASON/GMPLS network architecture, the signaling channel between the customer 12 and the control plane 14 is called a User Network Interface (UNI). Typically, the customer 12 uses the signaling channel, such as the UNI, to transmit a connection request associated with the data stream to the control plane 14. The connection request may include the network source and destination node addresses, the identification of the data ports, the bandwidth required, and other service identifiers. The control plane 14 then has to evaluate the existing network parameters, and identify at least one path that meets the connection request parameters and establish the path. Such processing by the control plane 14 support the instant bandwidth request. It can not support the reservation based bandwidth request, that is a bandwidth request that is booked some time ahead of the data transmission.

In the present network configuration, there is no signaling channel between the customer 12 and the control plane 14. Instead, the connection request originates from the RSS 16 or NMS 18 prior to the customer 12 transmitting the data. When the customer 12 transmits the data to the data plane 22, the data plane 22 is awaiting the data and has already established the connection. Thus, the only signaling that occurs is wholly within the network 20 or across the External Network to Network Interface (ENNI). When the signaling channel is no longer used, the control plane 14 workload is decreased, which simplify network implementation and operation.

The lack of need for a signaling channel also increases the network security. The control plane 14 is the brain of network and thus is prone to outside attack. The signaling channel increases the risk that the control plane may be attacked through the channel. Such access is undesirable as it could cause significant disruptions in network transport services. By eliminating the signaling channel, one of outside points of access to the control plane 14 is also eliminated, which decreases the possibility for unauthorized access to the control plane 14.

In an embodiment, the RSS 16, NMS 18, and/or control plane 14 may include reservation conflict resolution policies. The reservation conflict resolution policies may be used to establish the reservations within the network 20 and/or resolve conflicting reservations between customers 12, 24. For example, if a specific network node or link only has 500 megabits per second (Mbps) of bandwidth and two different reservations are attempting to reserve 300 Mbps of the bandwidth, then the reservation policies may be used to resolve such conflicts. Possible resolutions include: allocating all of the bandwidth to one reservation and none to the other reservation, allocating all of the bandwidth to one reservation and at least some of the remaining bandwidth to the other reservation, and allocating the bandwidth proportionally between the two reservations. Such resolutions may be dictated by the customers 12, 24, the priority of the reservation, the order of the reservation, and several other factors known to persons of ordinary skill in the art. Another solution may be to have the service provider assess the network resources and add more resources to the network prior to the service time. If desired, the reservation conflict resolution policies may also be used to create and/or modify time based service, state based service, reservation based service, modification of the bandwidth of a service section of an existing service, or a combination of these features.

In an embodiment, the RSS 16 and/or control plane 14 may maintain a database of the status of each reservation. Specifically, the database may contain entries for all of the reservations that affect the control plane 14, and the status of each reservation. One possible status can be that the reservation is scheduled, but has not been initiated. Another possible status is that the reserved connection has been established, but data has not yet been received from the customer 12. Another status may be that the data is being transmitted over the reserved connection. Yet another status may be that the data is being transmitted over the reserved connection, but the reservation has expired. Another status may be that the reservation is being or has been terminated, by a lack of reception of data from the customer 12, by expiration of the reservation, or by detection of a data termination message. Persons of ordinary skill in the art are aware of other status states that may be included for the reserved connections described herein.

Figure 2:
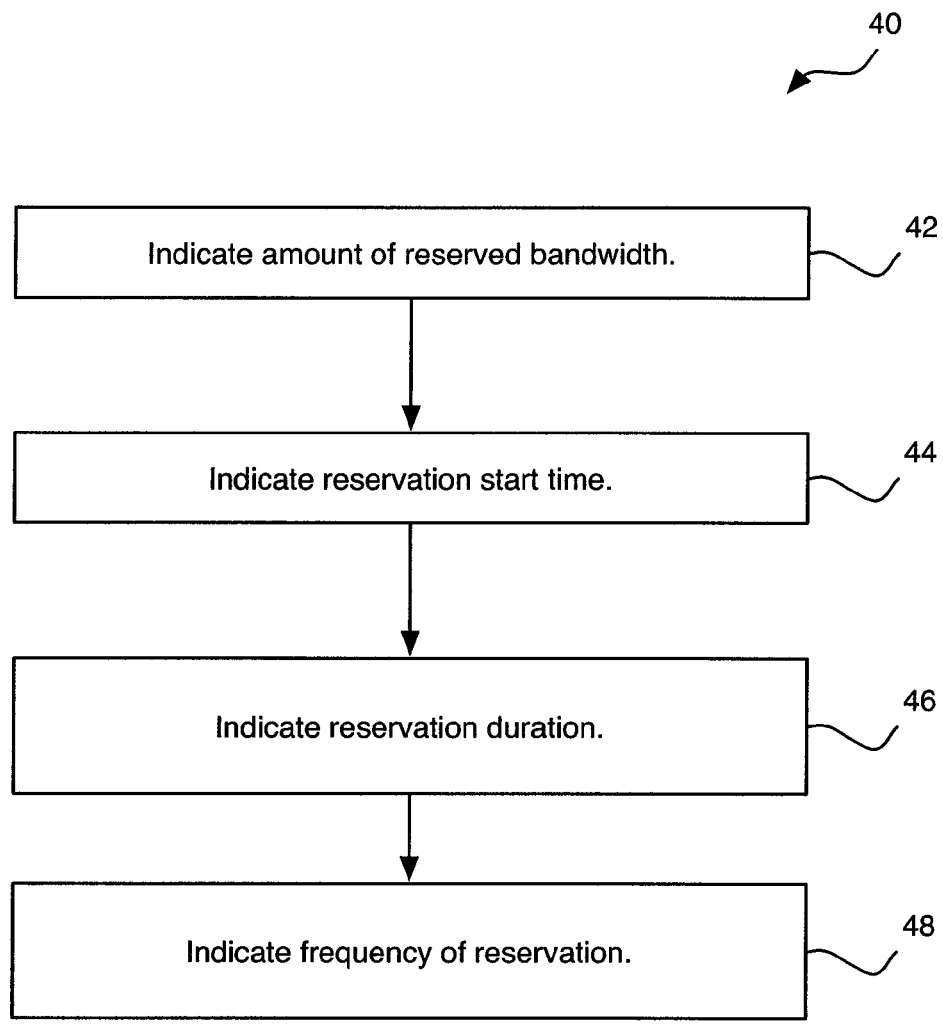
FIG. 2 is a flowchart of an embodiment of a reservation request method.

FIG. 2 is a flowchart of one embodiment of a method 40 for reserving network bandwidth. If desired, the method 40 may be used to reserve bandwidth on the system illustrated in FIG. 1. The method 40 begins when a customer indicates the amount of bandwidth it would like reserved (Block 42). The customer then indicates the start time of the reservation (Block 44) and the duration of the reservation (Block 46). Finally, the customer indicates the frequency of the reservation (Block 48). These blocks are discussed in detail below.

When the customer wants to reserve bandwidth on the network, the customer may send a reservation request to the RSS. As part of the reservation request, the customer may indicate the amount of bandwidth it would like reserved (Block 42). For example, the customer may indicate that it wants to reserve 500 Mbps of bandwidth. It should be appreciated that while 500 Mbps is used as an example herein, more or less bandwidth might be reserved. Alternatively, the customer may indicate that it desires to have as much bandwidth as it needs. In such an embodiment, the reserved bandwidth is the lesser of: the data output rate of the customer, the total bandwidth of the network, or the throughput rate of the control plane. Further, the requested bandwidth may be part of a policy profile, as discussed below.

As part of the reservation request, the customer may also indicate the starting time for the reservation (Block 44). In embodiments, the customer may indicate the start time of the reservation in terms of a date and a local time, such as 10:00 pm U.S. Central Daylight Savings Time on Nov. 1, 2006, or in terms of a universal time, such as 14:00 Greenwich Mean Time on Nov. 4, 2006. Alternatively, the customer may indicate the start time of the reservation in terms of another event, such as two minutes after the conclusion of the customer's pervious data transmission. Further, the requested start time may be part of a policy profile, as discussed below.

As part of the reservation request, the customer may also indicate the duration of the reservation (Block 46). In an embodiment, the customer may indicate the duration of the reservation in terms of a definite amount of time. For example, the customer may indicate that the reservation lasts 30 minutes. Alternatively, the customer may indicate the duration of the reservation by indicating the stop time for the reservation, using a date and either a local time or a universal time. For example, the customer may indicate the reservation lasts until 11:00 pm U.S. Central Daylight Savings Time on Nov. 1, 2006 or until 3:00 pm Greenwich Mean Time on Nov. 4, 2006. Further in the alternative, the customer may indicate that the duration of the reservation in terms of the amount of data transmitted. For example, the customer may indicate that the reservation lasts until 50 gigabits of data has been transmitted. Further, the requested duration may be part of a policy profile, as discussed below.

As part of the reservation request, the customer may also indicate the frequency of the reservation (Block 48). In an embodiment, the customer may indicate that the reservation is a one-time reservation. A one-time reservation is one in which the reservation does not reoccur. Alternatively, the customer may indicate that the reservation occurs more than once. For example, the customer may indicate specific dates and times for the reservation to reoccur. Alternatively, the customer can indicate that the reservation will periodically or occasionally reoccur. Specifically, the customer may indicate that the reservation reoccurs every day, on certain days of the week, on certain days of the month, or at certain times of the day. For example, the customer can request a 500 Mbps of bandwidth for two hours every day for three days. Alternatively, the customer can request 600 Mbps from 8:00 am to 8:00 pm and 150 Mbps from 8:00 pm to 10:00 pm. The customer may also indicate whether the reoccurrence has a stop date, or whether the reoccurrence should go on indefinitely. Further, at least one of the requested reoccurrences may be part of a policy profile, as discussed below.

In one embodiment, a reservation request may be in the form of a policy profile. Specifically, when a reservation start time occurs, the RSS may send the policy profile to the control plane. The control plane may maintain the policy profile and execute the policy rules specified in the policy profile. Table 1 illustrates one embodiment of a policy profile:

TABLE 1

| Rule Type | Time Duration | Action |
| --- | --- | --- |
| Time of Day | 8 am-5 pm | Establish and maintain the reserved connection |
|  | Other | Terminate reserved connection |
| Day of Week | Monday-Friday | 600 Mbps of bandwidth required |
|  | Saturday-Sunday | 200 Mbps of bandwidth required |

In an embodiment, one reservation may be used for a plurality of ports connecting the customer to the data plane. Specifically, the ports may all share the same policy profile. If desired, the policy profile may be modified such that the time based traffic patterns can be specified among the ports. For example, if there are 10 ports, during the day 4 ports may be allocated 200 Mbps of bandwidth, while the remaining 6 ports may be allocated 100 Mbps of bandwidth. At night, these values may change to 500 Mbps for 2 ports, and 50 Mbps for 8 ports.

Figure 3:
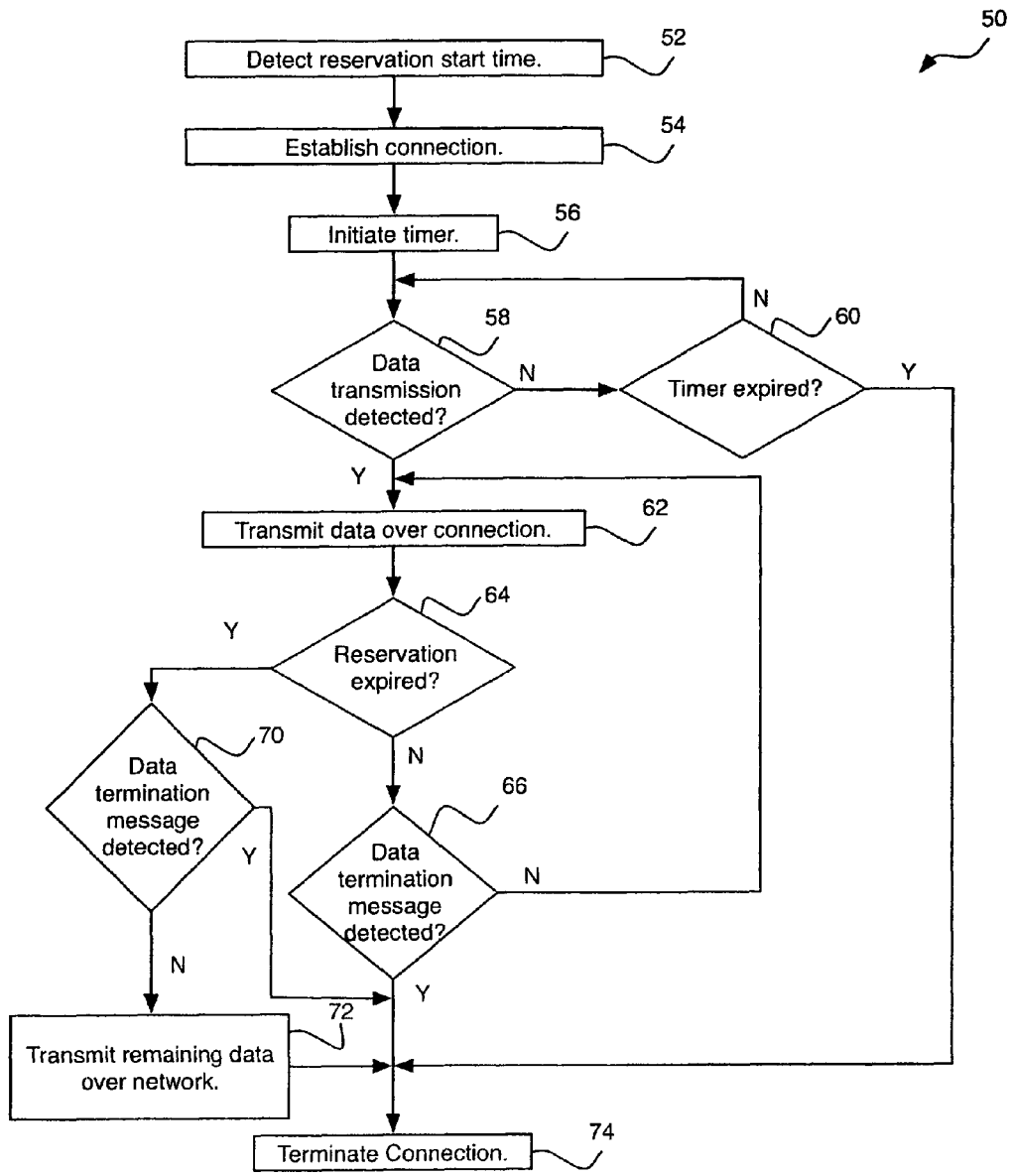
FIG. 3 is a flowchart of an embodiment of a data transport method.

FIG. 3 is a flowchart of one embodiment of a method 50 for transporting data through a network. If desired, the method 50 may be used to transport data through the networks illustrated in FIG. 1. The method 50 comprises a connection portion (Blocks 52, 54, 56, 58, and 60) that establishes the reserved connection through the network when the reservation start time occurs, and waits a pre-determined amount of time for the data to be transmitted by the customer. The method 50 further comprises a transmission portion (Blocks 62, 64, 66, 70, and 72) that transmits the data over the network using the reserved connection. Finally, the method 50 comprises a termination portion (Block 74) that terminates the reserved connection. Each of these steps is discuss in detail below.

The connection portion of the method 50 may comprise detecting the reservation start time (Block 52). The reservation start time may be detected using a variety of methods. For example, the RSS may store a database of reservations and compare the reservations to a clock. When the clock time is equal to the reservation time, then the RSS may send a message to the NMS and/or the control plane indicating that a reservation start time has been detected. Alternatively, the control plane and/or the NMS may store a database of reservations and indicate that a reservation start time has been detected when the clock time is equal to the reservation time. In such a case, the control plane and/or NMS may optionally send a message to one or more components, such as the RSS, indicating that the control plane has detected a reservation start time. After the reservation time has been detected, the method 50 may proceed to block 54.

The connection portion of the method 50 may further comprise establishing the reserved connection through the network (Block 54). As used herein, the term "reserved connection" refers to a path through a network that has a bandwidth not less than the bandwidth specified in the reservation, and that exists for a duration not less than the time specified in the reservation. When establishing the reserved connection through the network, the specific route that data will take through the network may be determined. Determining the specific route through the network may comprise selecting the specific network links, nodes, lines, routers, and/or switches that the data will contact as the data is transported across the network. Although the control plane may determine the route through the network, it is also contemplated that the NMS may also determine the route through the network. Further, the route selection may be determined by a negotiation between a plurality of components, such as the control plane 14 or NMS 18 in FIG. 1.

After the route has been selected, the components within the route are instructed to reserve some transport capacity for the data that is transmitted through the reserved connection. These components may allocate additional transport capacity to the data transmitted through the reserved connection and/or allocate transport capacity to other data streams, but the bandwidth allocated the reserved connection never falls below the bandwidth specified in the reservation. In an embodiment, the nodes may be equipment with time triggers and time event functionality. The time triggers and time event functionality may make the nodes aware of the reservations in the network and allow each node to act accordingly. For example, each node may be aware of the policy profiles described above. Such an embodiment distributes the processing throughout the network. After the reserved connection has been established, the method 50 may proceed to block 56.

Returning to FIG. 3, the connection portion of the method 50 may further comprise initiating a timer (Block 56). Specifically, the timer may measure the elapsed time since the start of the reservation. The timer may be used to determine when the threshold waiting period has expired (Block 60) and/or to determine when the reservation has expired (Block 64). After the timer is initiated, the method 50 may proceed to block 58.

The connection portion of the method 50 may further comprise detecting the data transmission (Block 58). Specifically, any connections between the customer and the data plane may be monitored to determine when the customer begins transmitting data associated with the reservation to the data plane. The detection of the transmitted data may be done by the data plane. If a data transmission is not detected, then the method 50 may proceed to block 60. If a data transmission is detected, then the method 50 may proceed to block 62.

The connection portion of the method 50 may further comprise determining whether the timer is expired (Block 60). When determining whether the timer has expired, a comparison may be made between the timer and a threshold waiting time. The threshold waiting time is the elapsed time that the reserved connection will be unused before the network terminates the reserved connection. The threshold waiting time may be viewed as the time which the network will hold open the reserved connection before it terminates the reserved connection and makes the reserved bandwidth available to other data. Generally, the threshold waiting time may be defined by service provider, such that the same threshold waiting time is used for all reservations. However, it is also contemplated that various threshold waiting times may be defined such that different threshold waiting times are used for different customers 12, 24 or reservations. If the timer is not expired, then the method 50 may return to block 58. If the timer is expired, then the method 50 may proceed to block 74.

The transmission portion of the method 50 may comprise transmitting the data through the network using the reserved connection (Block 62). In an embodiment, the control plane may receive data from the customer and transmit the data over the network using the reserved connection. More specifically the data may be transmitted over the network using the route that was determined when establishing the reserved connection. While the data is being transmitted through the reserved connection, the method 50 proceeds to block 64.

The transmission portion of the method 50 may further comprise determining whether the reservation has expired (Block 64). Determining whether the reservation has expired may include a comparison of the time initiated at block 56 with the duration specified in the reservation. Alternatively, determining whether the reservation has expired may include a comparison of a clock with the stop time specified in the reservation. If the timer has met or exceeds the duration specified in the reservation, then the reservation may have expired. Similarly, if the clock has met or exceeds the stop time specified in the reservation, then the reservation may have expired. Such a determination may occur at the control plane, the NMS, or the RSS. If the reservation has not expired, then the method 50 may proceed to block 66. If the reservation has expired, then the method 50 may proceed to block 70.

In an embodiment, the customer may request an extension of the duration after the reservation has been submitted through the RSS. More specifically, the customer may request that the original duration specified in a reservation be extended, perhaps in response to a message that the reservation will expire before all of the data has been transported. In such a case, the RSS may allow the customer to extend the duration of the reservation and delay termination of the reserved connection.

The transmission portion of the method 50 may further comprise determining whether a data termination message has been detected (Block 66). As used herein, the term "data termination message" refers to a message at the end of a data stream indicating that there is no more data in the data stream. The data termination message is used to indicate that the data stream has ended and that the reserved connection may be terminated. The detection of the data termination message may occur at the data plane. Referring to block 66, if a data termination message has not been detected, then the method 50 may return to block 62. However, if a data termination message has been detected, then the method 50 may proceed to block 74.

The transmission portion of the method 50 may further comprise determining whether the customer has requested that the connection be terminated when the reservation expires (Block 70). Specifically, the control plane may not terminate the connection in the middle of the customer's data transmission unless the customer has expressly authorized the network provider to do so. If a data termination message has not been detected and the customer has asked the network to take down the connection when the reservation expires, then the control plane will instruct the data plane to send a disconnection signal to the customer, and the method 50 may proceed to block 74. If customer has chosen to wait on the termination message to take down the connection, then the method 50 may proceed to block 72.

The transmission portion of the method 50 may further comprise transmitting the data through the network without using the reserved connection (Block 72). After the reservation has expired, data may still be originating from the customer. In such a case, it is contemplated that the network allows the data to continue to use the reserved connection until the data has been fully transmitted. In this case, the control plane may inform the RSS of the connection extension. The RSS may extend some period for the connection. The full transmission of the data may be determined by detecting the data termination message. However, if the data does not contain a data termination message, then it may be preferable to discontinue transmitting the data over the reserved connection and instead transmit the data over the network using traditional methods. In such a case, the control plane or another network component may wait for a break in the data stream to stop routing the data along the reserved connection, or may immediately stop routing the data along the reserved connection and route the data along the other routes through the network. It is possible that when the data is no longer routed through the reserved connection, the data may follow the same route as the reserved connection. However, such data will no longer have use of the reserved resources and will have to use any remaining network resources. The method 50 then may proceed to block 74.

The termination portion of the method 50 may comprise terminating the reserved connection (Block 74). Terminating the reserved connection may include releasing the reserved bandwidth from the affected network components. Such a release may be embodied in a message sent to the affected components indicating that the components may use their resources on any network traffic. Alternatively, the termination of the connection may include the termination of the association between the data from the customer and the reserved connection, so that the reserved connection can be transferred to another reservation or associated with another customer data stream. Persons of ordinary skill in the art are aware of other methods for terminating the reserved connection.

Figure 4:
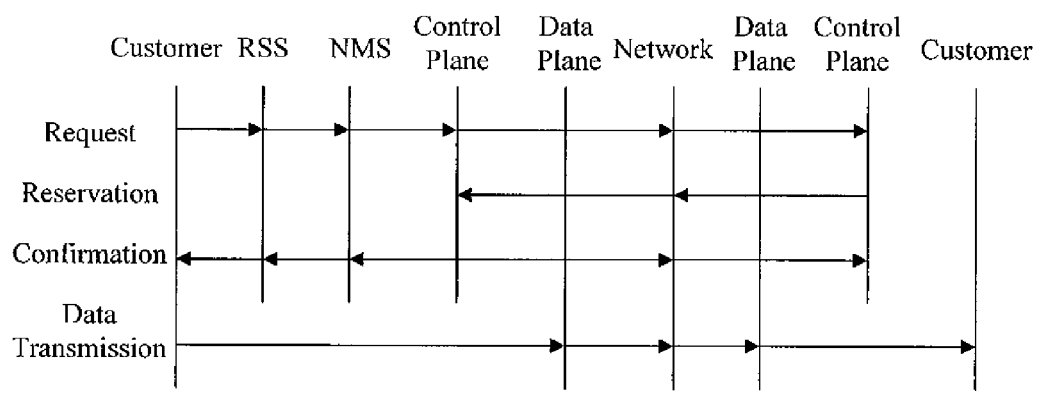
FIG. 4 is a diagram of one embodiment of the signaling flow for the data transport method.

FIG. 4 is a diagram of one embodiment of the signaling flow that may be used to establish the reserved connection. Specifically, the reservation request may originate at the customer and is passed onto the RSS. The RSS may record the reservation request in a reservation database and forward the reservation request to the NMS and the control plane for the source node. Either the NMS or the control plane for the source node may propose a route for the reserved connection. The control plane for the source node sends the reservation request with the proposed route across the network to the destination control plane. The control plane for destination node may evaluate the proposed route and may respond to the reservation with either an alternate proposed route or an acceptance of the proposed route. After the source control plane receives the response from the destination control plane, the source control plane sends the reservation confirmation to the destination control plane, and the NMS, the RSS. When the reservation time arrives, the customer may then transmit the data to the data plane for the source node, which then forwards the data to the data plane for destination node using the reserved connection.

In an embodiment, existing reserved connections may be used for further reservations. Specifically, a control plane may have established a reserved connection through a network and used the reserved connection to transport data associated with a reservation. When the data stream ends, instead of terminating the reserved connection, the control plane may use the established reserved connection for a subsequent reservation. Such an embodiment reduces the need for the control plane to repeatedly establish and terminate similar reserved connections.

Figure 5:
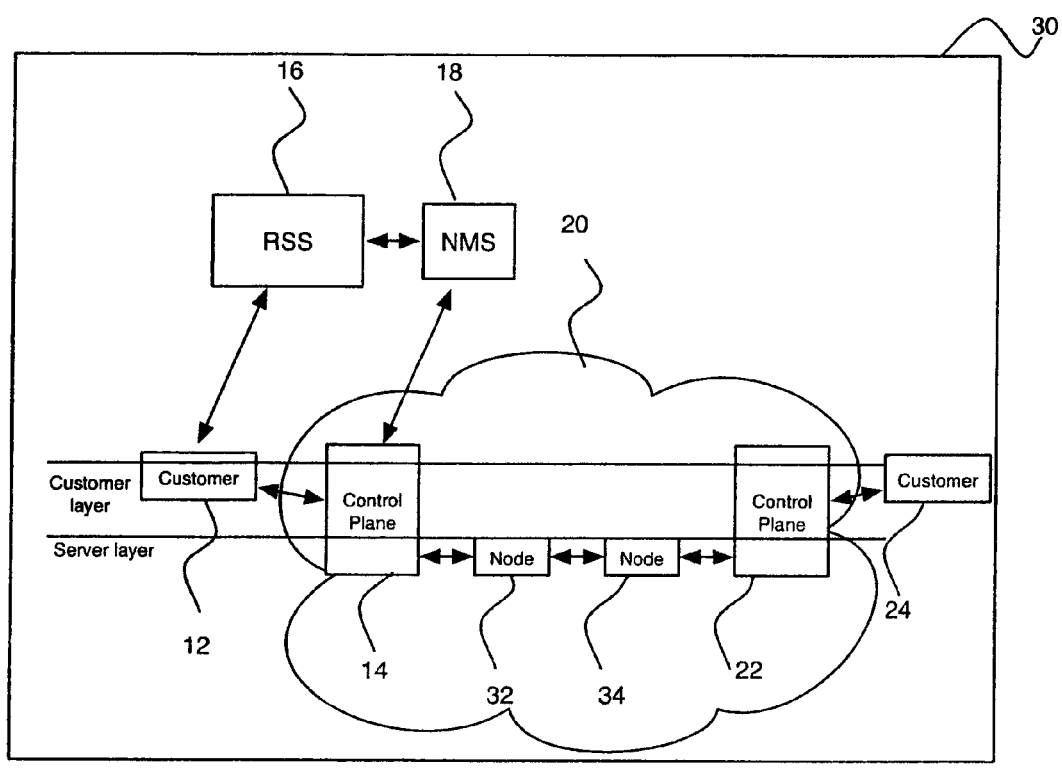
FIG. 5 is another embodiment of a communications network framework.

FIG. 5 illustrates an embodiment of a system 30 within which network bandwidth may be reserved. The system 30 is substantially similar to the system 10 illustrated in FIG. 1, with the exception that the system 30 includes nodes 32 and 34, and distinguishes between a customer layer, such as an Internet Protocol (IP) layer, and the server layer, such as an Optical Transport Network (OTN) layer. Generally, the client layer requests service from the server layer, while the server layer provides the data transport service to the client layer. Specifically, both ends of the network 20 have client layer interfaces, and the internal network interfaces have server layer interfaces. The differentiation between the two layers allows the customer 12 to make a reservation request with the RSS 16 without knowing the network 20 topology and/or architecture. Instead, when the reservation time occurs, the RSS 16 sends a message to NMS 18 and the control plane 14 indicating the a reserved connection needs to be established. The control plane 14 and/or the NMS 18 may then select the network route over the client layer and server layer to establish the reserved connection. Specifically, the network route may pass through node 32 and node 34. When the customer 12 begins transmitting data to the control plane 14, the customer 12 does not need to know and likely will not know that the data is passing through nodes 32, 34 because nodes 32, 34 are part of the server layer, not the client layer.

The present network configuration may also be implemented over a multi-domain configuration. Specifically, one RSS may support a plurality of domains or each domain may have its own RSS. If the customer needs to make a reservation build and build access across the network including across a plurality of domains, the customer may make the reservation using the single RSS or the RSSs for each domain. Each domain and RSS may be configured and may create the reserved connection as described above.

Figure 6:
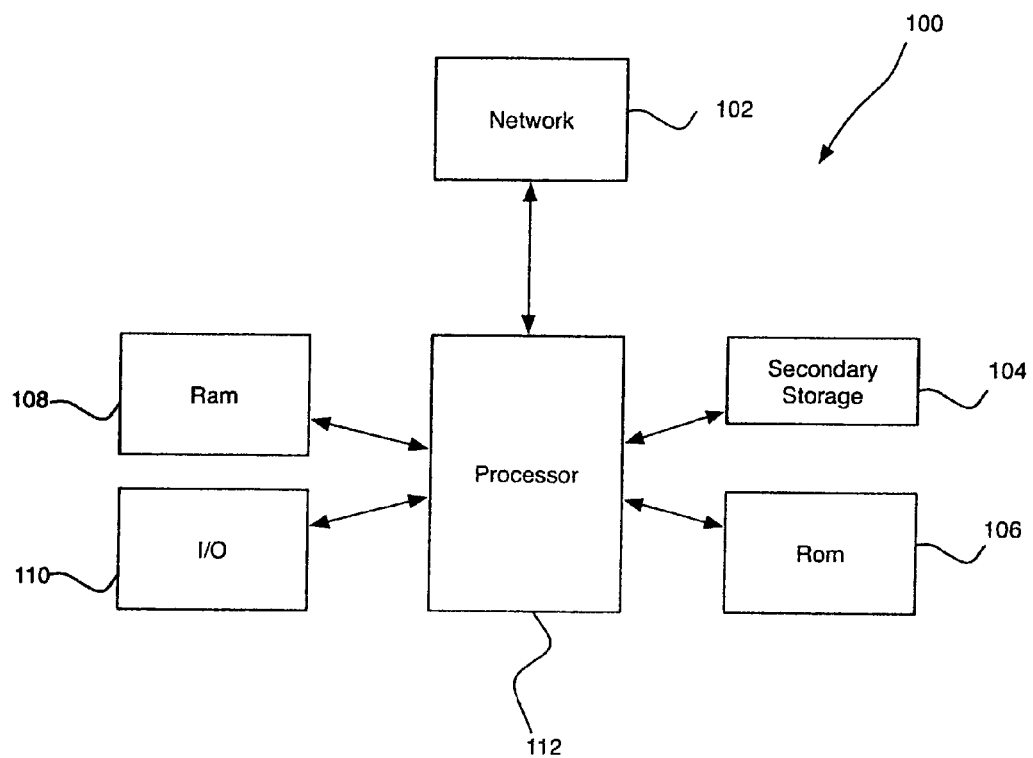
FIG. 6 illustrates an exemplary general purpose computer system.

The network described above may be implemented on any general-purpose computer with sufficient processing power, memory resources, and network throughput capability to handle the necessary workload placed upon it. FIG. 6 illustrates a typical, general-purpose computer system suitable for implementing one or more embodiments of the system components disclosed herein. The computer system 100 includes a processor 112 (which may be referred to as a central processor unit or CPU) that is in communication with memory devices including secondary storage 104, read only memory (ROM) 106, random access memory (RAM) 108, input/output (I/O) devices 110, and network connectivity devices 102. The processor 112 may be implemented as one or more CPU chips.

The secondary storage 104 is typically comprised of one or more disk drives or tape drives and is used for non-volatile storage of data and as an over-flow data storage device if RAM 108 is not large enough to hold all working data. Secondary storage 104 may be used to store programs that are loaded into RAM 108 when such programs are selected for execution. The ROM 106 is used to store instructions and perhaps data that are read during program execution. ROM 106 is a non-volatile memory device that typically has a small memory capacity relative to the larger memory capacity of secondary storage 104. The RAM 108 is used to store volatile data and perhaps to store instructions. Access to both ROM 106 and RAM 108 is typically faster than to secondary storage 104.

I/O devices 110 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 102 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 102 may enable the processor 112 to communicate with an Internet or one or more intranets. With such a reserved connection, it is contemplated that the processor 112 might receive information from the network, or might output information to the network in the course of performing the above-described method steps. Such information, which is often represented as a sequence of instructions to be executed using processor 112, may be received from and outputted to the network, for example, in the form of a computer data signal embodied in a carrier wave.

Such information, which may include data or instructions to be executed using processor 112, may be received from and outputted to the network, for example, in the form of a computer data baseband signal or signal embodied in a carrier wave. The baseband signal or signal embodied in the carrier wave generated by the network connectivity devices 102 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 112 executes instructions, codes, computer programs, scripts which it accesses from hard disk, floppy disk, optical disk (these various disk based systems may all be considered secondary storage 104), ROM 106, RAM 108, or the network connectivity devices 102.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as directly coupled, connected, or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A telecommunications network comprising components configured to:
   receive a reservation from a customer, wherein the reservation comprises a reservation time;
   reserve a network resource specified in the reservation;

establish a reserved connection through a network at the reservation time, the reserved connection based on the reservation;

subsequent to the establishment of the reserved connection, detect a data stream transmitted from the customer via a plurality of parallel connections coupling the customer to the network;

allow the data stream to be transported over the network using the reserved connection;

receive a data termination message as part of the data stream; and terminate the reserved connection responsive to receiving the data termination message, wherein the customer is not part of the network, and wherein the reservation dictates the bandwidth allocated to each of the parallel connections.

2. The telecommunications network component of claim 1, wherein the reserved connection is established through the network,
wherein the establishment of a reserved connection reduces the network resources available in the network,
wherein the reservation time comprises a start time, and a duration, and
wherein the network resource is bandwidth.

3. The telecommunications network of claim 1, wherein the reservation is received by a reservation scheduling system (RSS),
wherein the reserved connection is established by a control plane that has knowledge of the network, and
wherein the control plane is not part of either the RSS or a network management system.

4. The telecommunications network of claim 3, wherein the control plane modifies the reserved connection based on conditions within the network.

5. A method for reserving bandwidth on a network, the method comprising:
submitting a reservation request specifying a bandwidth requirement and a start time to a reservation scheduling system (RSS), wherein the RSS interacts with a network management system and a control plane to make the reservation within the network, and wherein the reservation request is not submitted via a data plane or the control plane;
receiving a confirmation that the reservation has been accepted from the RSS; and
subsequently transmitting a data stream to the data plane at the start time,
wherein the data stream is transported over the network using no more than the bandwidth specified in the reservation request, and
wherein the data stream comprises a data termination message that indicates the end of the data stream.

6. The method of claim 5, wherein the reservation request further comprises a duration or a stop time, and a reservation frequency that indicates when the reservation will reoccur, and wherein the bandwidth, specified in the reservation request changes based on one or more of the following: the time of day, the day of the week, and the properties of the data.

7. The method of claim 6, further comprising: submitting a reservation extension, and continuing to transmit the data after the duration or stop time has occurred, the data stream continuing to be transported over the network using no more than the bandwidth specified in the reservation request.

8. The method of claim 5, wherein the data is transmitted to the data plane via a plurality of parallel connections, and wherein the reservation dictates the bandwidth allocated to each of the parallel connections.

9. The method of claim 5, wherein the control plane has knowledge of the network,
wherein the control plane is not part of either the RSS or the network management system,
wherein the control plane establishes a path through the network based on the reservation, and
wherein the data stream is transported over the network via the path.

10. The method of claim 9, wherein the control plane modifies the path based on conditions within the network.

11. The method of claim 9, wherein the control plane terminates the path upon the data plane receiving the data termination message.

12. A system comprising:
a network comprising a plurality of nodes having a control plane and data plane;
a reservation scheduling system (RSS) in communication with the control plane, a network management system, and a customer that originates a reservation; and
a plurality of connections through the network from the customer,
wherein the customer only interacts with the RSS to establish the reservation and the RSS interacts with the NMS and/or the control plane to establish the reservation;
wherein the reservation dictates the bandwidth allocated to each connection,
wherein the data plane transmits data received from the customer over the network based on the reservation, and
wherein the customer transmits a data termination message to end the reservation.

13. The system of claim 12, wherein the customer initiates a reservation request, and wherein the data plane transmits the data without receiving any reservation information from the customer.

14. The system of claim 13, wherein the control plane does not receive the reservation request from the customer, and wherein the reservation scheduling system does not receive the data from the customer or the data plane.

15. The system of claim 12, wherein the network is an Automatically Switched Optical Network (ASON) or Generalized Multi-Protocol Labeling Switching (GMPLS) network, and wherein the network is an optical network.

16. The system of claim 12, wherein there is not a user network interface between the control plane and the customer.

17. The system of claim 12, wherein the control plane has knowledge of the network,
wherein the control plane is not part of either the reservation scheduling system or a network management system, and
wherein the control plane establishes a path through the network for the data received from the customer.

18. The system of claim 17, wherein the control plane modifies the path based on conditions within the network.

19. The system of claim 17, wherein the control plane terminates the path upon receiving the data termination message.

20. The system of claim 12, wherein the customer transmits the data termination message on the data plane.

* * * * *